US012347608B2

(12) United States Patent
Yoshino et al.

(10) Patent No.: US 12,347,608 B2
(45) Date of Patent: Jul. 1, 2025

(54) CIRCUIT SUBSTRATE

(71) Applicant: TDK Corporation, Tokyo (JP)

(72) Inventors: Hanako Yoshino, Tokyo (JP); Keigo Higashida, Tokyo (JP); Taichi Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 693 days.

(21) Appl. No.: 17/731,292

(22) Filed: Apr. 28, 2022

(65) Prior Publication Data

US 2022/0384089 A1 Dec. 1, 2022

(30) Foreign Application Priority Data

May 28, 2021 (JP) ................................ 2021-089780

(51) Int. Cl.
*H01F 27/29* (2006.01)
*H01F 17/04* (2006.01)

(52) U.S. Cl.
CPC ......... *H01F 27/292* (2013.01); *H01F 17/045* (2013.01)

(58) Field of Classification Search
CPC ............................ H01F 27/292; H01F 17/045
See application file for complete search history.

(56) References Cited

U.S. PATENT DOCUMENTS 6,087,921 A * 7/2000 Morrison ............ H01F 17/0033 336/200
2005/0057334 A1* 3/2005 Kitagawa ............... H05K 1/181 336/83
2008/0309445 A1* 12/2008 Suzuki .................. H01F 41/069 336/183
2016/0322706 A1* 11/2016 Komachi ................ H01F 27/36
2016/0323019 A1* 11/2016 Komachi ................. H04B 5/26
2018/0226181 A1* 8/2018 Aoki ..................... H01F 41/086

FOREIGN PATENT DOCUMENTS

JP 2002-261430 A 9/2002
JP 2008-140903 A 6/2008

* cited by examiner

*Primary Examiner* — Malcolm Barnes
(74) *Attorney, Agent, or Firm* — Rimon P.C.

(57) ABSTRACT

Disclosed herein is a circuit substrate that includes a coil component mounted on the substrate having first and second land patterns and first and second dummy land patterns. The coil component includes a first signal terminal and a first dummy terminal which are provided on the first flange part, a second signal terminal and a second dummy terminal which are provided on the second flange part, and a wire wound around the winding core part and whose one end and other end are connected respectively to the first signal terminal and the second signal terminal. The coil component is mounted on the substrate such that the first and second signal terminals are connected respectively to the first and second land patterns and that the first and second dummy patterns are connected respectively to the first and second dummy land patterns.

9 Claims, 4 Drawing Sheets

CIRCUIT SUBSTRATE

BACKGROUND OF THE INVENTION

Field of the Invention

The present invention relates to a circuit substrate and, more particularly, to a circuit substrate on which a chip-type coil component is surface-mounted.

Description of Related Art

JP 2008-140903A discloses a structure in which a pair of terminal electrodes of a coil component mounted on a substrate is connected to a signal line and another pair of terminal electrodes of the coil component is connected to a ground pattern. This allows the coil component to function as an LC composite component and reduces an insertion loss.

However, in the mounting structure described in JP 2008-140903A, a capacitance between the signal line and the ground increases to disadvantageously reduce impedance in a high frequency region.

SUMMARY

It is therefore an object of the present invention is to suppress a reduction in impedance in a high frequency region in a circuit substrate on which a chip-type coil component is surface-mounted.

A circuit substrate according to the present invention includes a substrate and a chip-type coil component surface-mounted on the substrate. The substrate includes first and second signal lines, first and second land patterns connected respectively to the first and second signal lines, and first and second dummy land patterns which are in a floating state. The coil component includes: a drum-shaped core having first and second flange parts and a winding core part positioned between the first and second flange parts; a first signal terminal and a first dummy terminal which are provided on the first flange part; a second signal terminal and a second dummy terminal which are provided on the second flange part; and a wire which is wound around the winding core part and whose one end and the other end are connected respectively to the first signal terminal and the second signal terminal. The coil component is mounted on the substrate such that the first and second signal terminals are connected respectively to the first and second land patterns and that the first and second dummy patterns are connected respectively to the first and second dummy land patterns.

According to the present invention, the dummy land patterns are in a floating state, so that as compared to a case where the land pattern and dummy land pattern are short-circuited, a capacitance between the land pattern and the ground is reduced. This can suppress a reduction in impedance in a high-frequency region. In addition, since the dummy land pattern is connected to the dummy terminal, sufficient mounting strength of the coil component with respect to the substrate can be ensured.

In the present invention, the first and second dummy land patterns may each be an independent pattern not connected to any other pattern. This can prevent the occurrence of noise due to the presence of the dummy land pattern.

In the present invention, the first and second land patterns may be smaller in effective area than the first and second dummy land patterns. This can further reduce a capacitance between the land pattern and the ground. In this case, the first and second land patterns may be the same in outer size as the first and second dummy land patterns and may each have a reduced effective area due to the presence of cuts formed therein. This can ensure sufficient connection strength between the land pattern and the signal terminal through a solder.

As described above, according to the present invention, a reduction in impedance in a high frequency region can be suppressed in a circuit substrate on which a chip-type coil component is surface-mounted.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
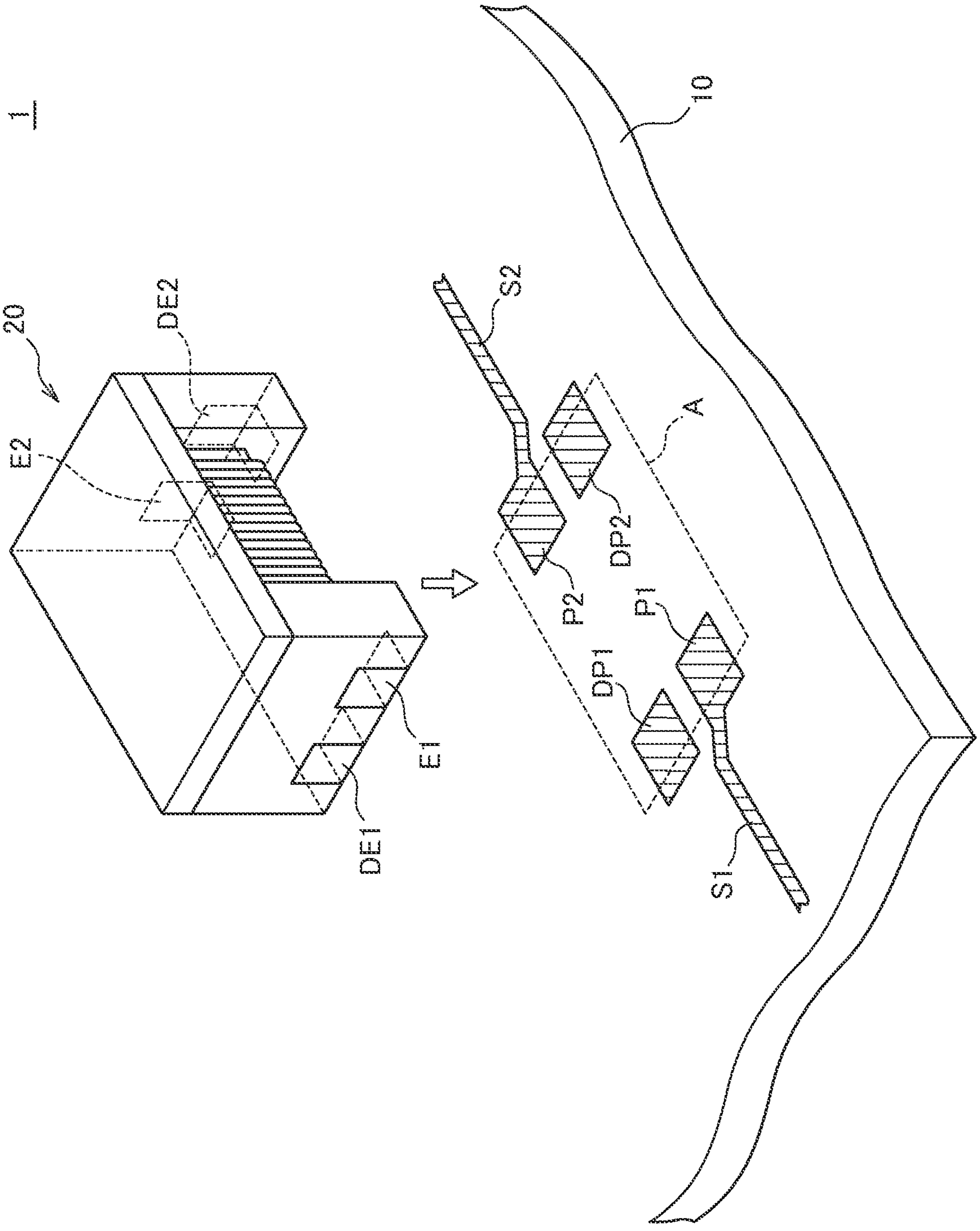
FIG. 1 is a schematic exploded perspective view illustrating the outer appearance of a circuit substrate 1 according to a preferred embodiment of the present invention.

FIG. 1 is a schematic exploded perspective view illustrating the outer appearance of a circuit substrate 1 according to a preferred embodiment of the present invention.

As illustrated in FIG. 1, the circuit substrate 1 according to the present embodiment includes a substrate 10 and a chip-type coil component 20 surface-mounted in a component mounting area A defined on the substrate 10. There are provided on the surface of the substrate 10 signal lines S1 and S2, land patterns P1 and P2 connected respectively to the signal lines S1 and S2, and dummy land patterns DP1 and DP2. The land patterns P1, P2 and dummy land patterns DP1, DP2 are all positioned in the component mounting area A. The dummy land patterns DP1 and DP2 are each an independent pattern (electrically floating pattern) not connected to any other pattern. In the example of FIG. 1, the land pattern P1 and dummy land pattern DP2 are disposed opposite to each other, and the land pattern P2 and dummy land pattern DP1 are disposed opposite to each other. In other words, the land patterns P1 and P2 are positioned diagonally to each other, and the dummy land patterns DP1 and DP2 are positioned diagonally to each other.

Figure 2:
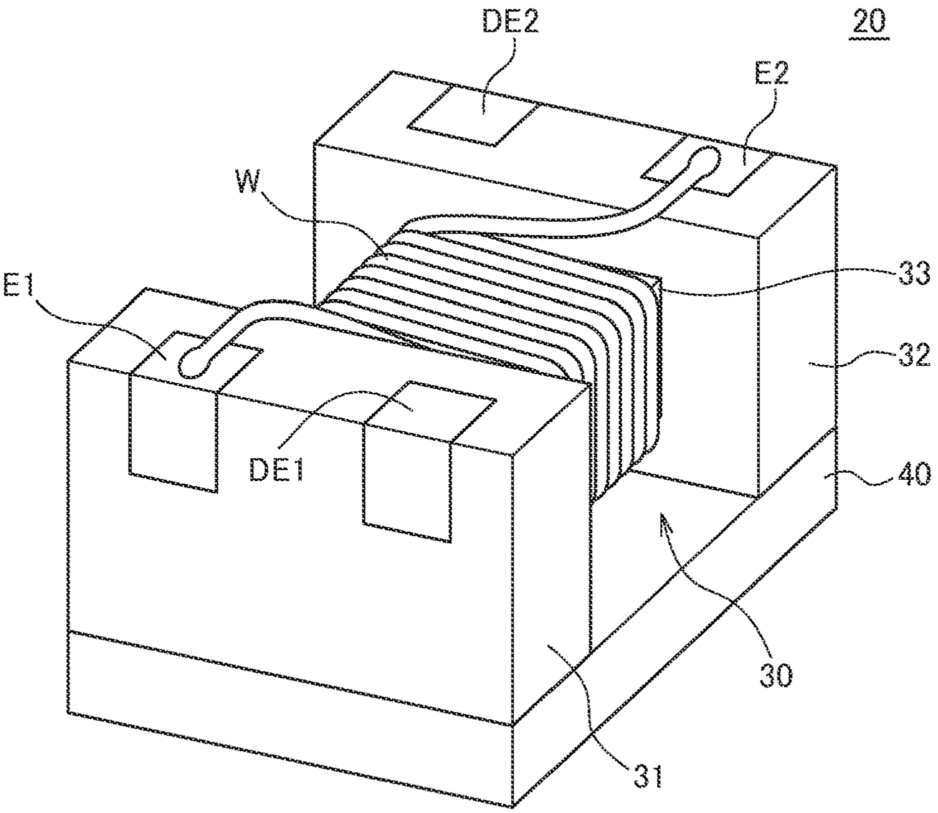
FIG. 2 is a schematic perspective view illustrating the outer appearance of the coil component 20.

FIG. 2 is a schematic perspective view illustrating the outer appearance of the coil component 20.

As illustrated in FIG. 2, the coil component 20 includes: a drum-shaped core 30 having flange parts 31, 32 and a winding core part 33; a plate-shaped core 40 fixed to the flange parts 31 and 32; a signal terminal E1 and a dummy terminal DE1 which are provided on the flange part 31; a signal terminal E2 and a dummy terminal DE2 which are provided on the flange part 32; and a wire W wound around the winding core part 33. The wire W is a coated conductive wire having a good conductor such as copper as a core material.

The drum-shaped core 30 is a drum-shaped block made of a high permeability material such as ferrite and has a structure obtained by integrating the flange parts 31, 32 and the winding core part 33 provided therebetween. The plate-shaped core 40 is a plate-shaped block also made of a high permeability material such as ferrite. The drum-shaped core 30 and the plate-shaped core 40 are fixed to each other through an adhesive or the like. One end of the wire W is connected to the signal terminal E1, and the other end thereof is connected to the signal terminal E2. The dummy terminals DE1 and DE2 are connected with no wire. The signal terminals E1, E2 and dummy terminals DE1, DE2 may each be made of a silver paste fired on the drum-shaped core 30 or may each be constituted by a terminal fitting bonded to the drum-shaped core 30.

The coil component 20 is mounted on the substrate 10 such that the signal terminals E1 and E2 are connected respectively to the land patterns P1 and P2 and that the dummy terminals DE1 and DE2 are connected respectively to the dummy land patterns DP1 and DP2. The connection between the signal terminal (E1, E2) and the dummy terminal (DE1, DE2) and the connection between the land pattern (P1, P2) and the dummy land pattern (DP1, DP2) are each made through a solder 50 as illustrated in the cross-sectional view of FIG. 3.

Figure 3:
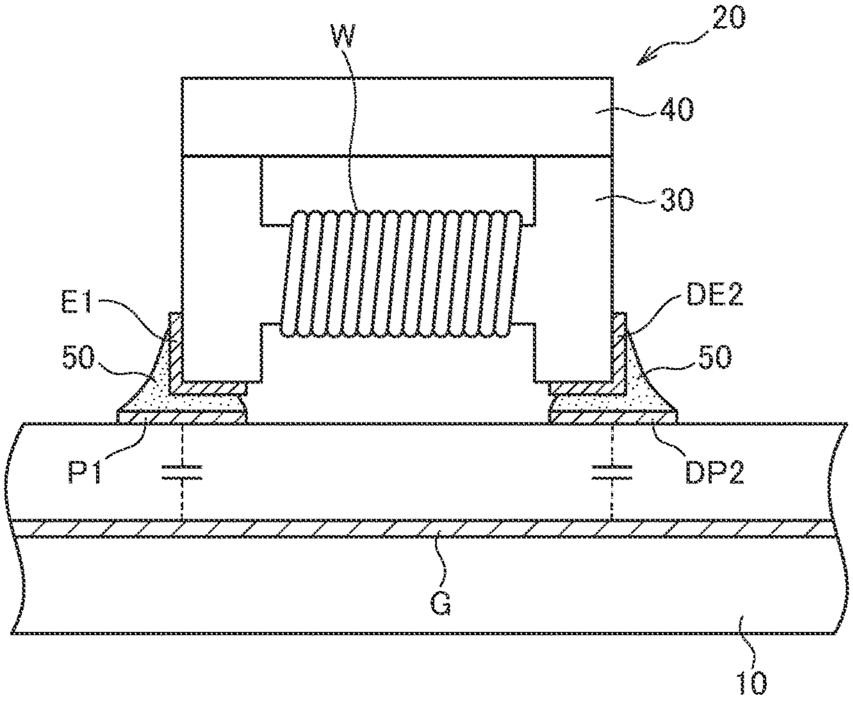
FIG. 3 is a schematic cross-sectional view of the circuit substrate 1.

As illustrated in FIG. 3, a ground pattern G is provided inside the substrate 10 at a position overlapping the land patterns P1, P2 and dummy land patterns DP1, DP2. This generates a stray capacitance between the land and dummy land patterns (P1, P2, DP1, DP2) and the ground pattern G.

Figure 4:
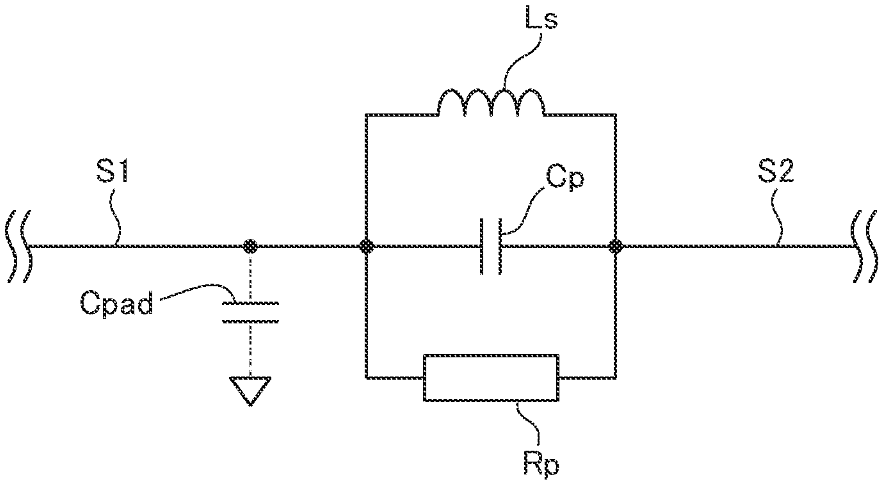
FIG. 4 is an equivalent circuit diagram of the coil component 20 in a state of being mounted on the substrate 10.

FIG. 4 is an equivalent circuit diagram of the coil component 20 in a state of being mounted on the substrate 10.

As illustrated in FIG. 4, the coil component 20 can be represented by an equivalent circuit in which an inductance component Ls, a capacitance component Cp, and a resistance component Rp are connected in parallel. In a state where the coil component 20 is mounted on the substrate 10, a stray capacitance component Cpad generated between the land patterns P1, P2 and the ground pattern G is added. On the other hand, the stray capacitance generated between the dummy land patterns DP1 and DP2 is not included in the stray capacitance component Cpad since the land pattern P1 and the dummy land pattern DP1 are isolated from each other, and the land pattern P2 and the dummy land pattern DP2 are isolated from each other. This reduces the stray capacitance component Cpad to suppress a reduction in impedance in a high frequency region. Further, since the dummy terminals DE1, DE2 and the dummy land patterns DP1, DP2 are respectively connected to each other through the solder 50, sufficient mounting strength is provided to the coil component 20.

Figure 5:
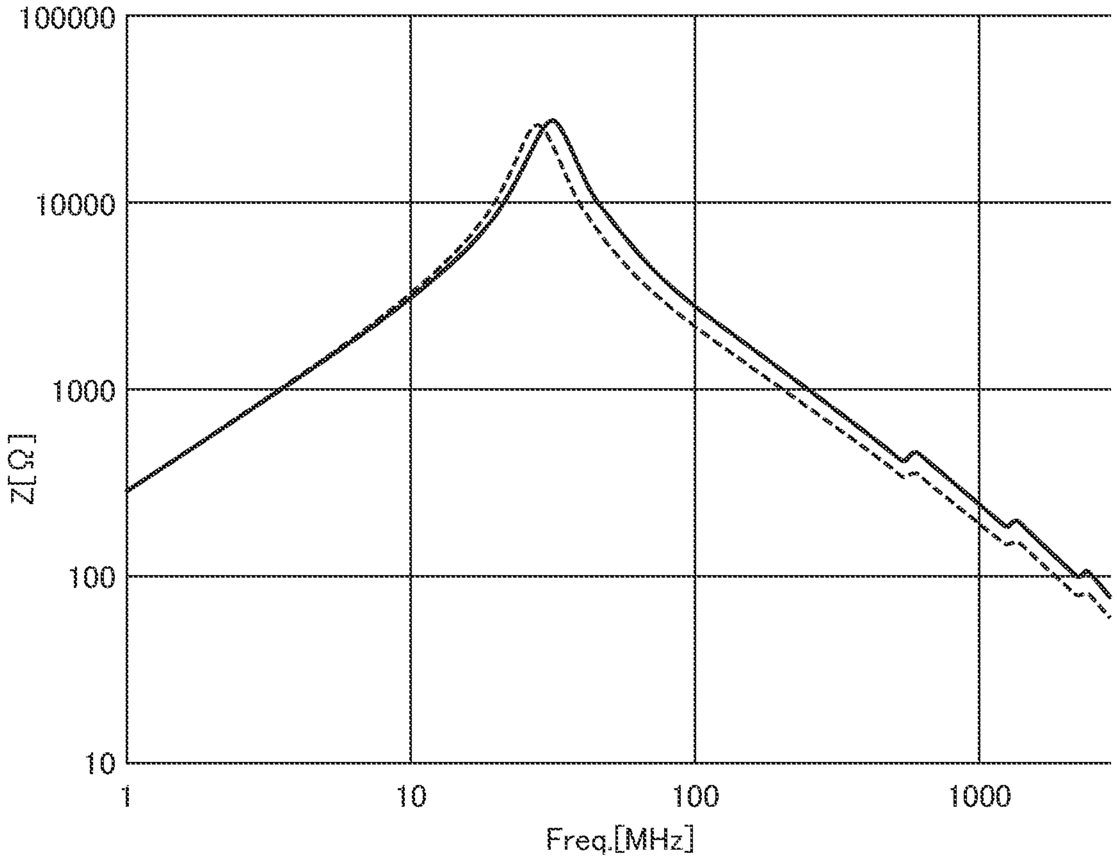
FIG. 5 is a graph for explaining effects of the present embodiment, in which the solid curve indicates characteristics of the coil component 20 in a state of being mounted on the substrate 10, and the dashed curve indicates characteristics of the coil component 20 when the land patterns P1, P2 and the dummy land patterns DP1, DP2 are integrated respectively with each other.

FIG. 5 is a graph for explaining effects of the present embodiment, in which the solid curve indicates characteristics of the coil component 20 in a state of being mounted on the substrate 10 (present embodiment), and the dashed curve indicates characteristics of the coil component 20 when the land patterns P1, P2 and the dummy land patterns DP1, DP2 are integrated respectively with each other (comparative example). As can be seen from FIG. 5, in a low frequency region, there is almost no difference in impedance between the circuit substrate 1 according to the present embodiment and the circuit substrate according to the comparative example, whereas in a high frequency region, the circuit substrate 1 according to the present embodiment exhibits higher impedance.

Figure 6:
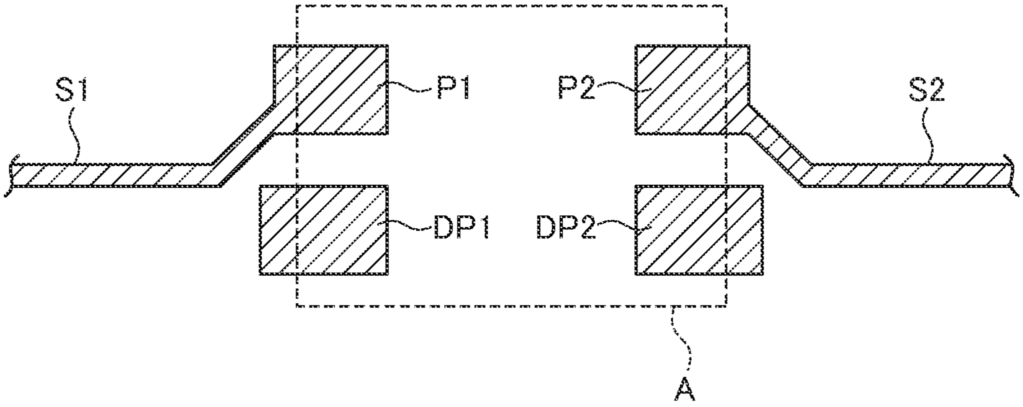
FIG. 6 is a schematic plan view illustrating a pattern arrangement on the substrate 10 according to a first modification.

FIG. 6 is a schematic plan view illustrating a pattern arrangement on the substrate 10 according to a first modification.

The pattern layout according to the first modification illustrated in FIG. 6 differs from the pattern layout according to the above embodiment in that the land patterns P1 and P2 are disposed opposite to each other, and the dummy land patterns DP1 and DP2 are disposed opposite to each other. In this case, in the coil component 20 to be mounted on the substrate 10, the wire connection positions need to be changed. Specifically, the positions of the signal terminal E1 and dummy terminal DE1 in FIG. 2 are interchanged. As exemplified by the first modification, the layout of the land patterns P1, P2 and dummy land patterns DP1, DP2 is not particularly limited.

Figure 7:
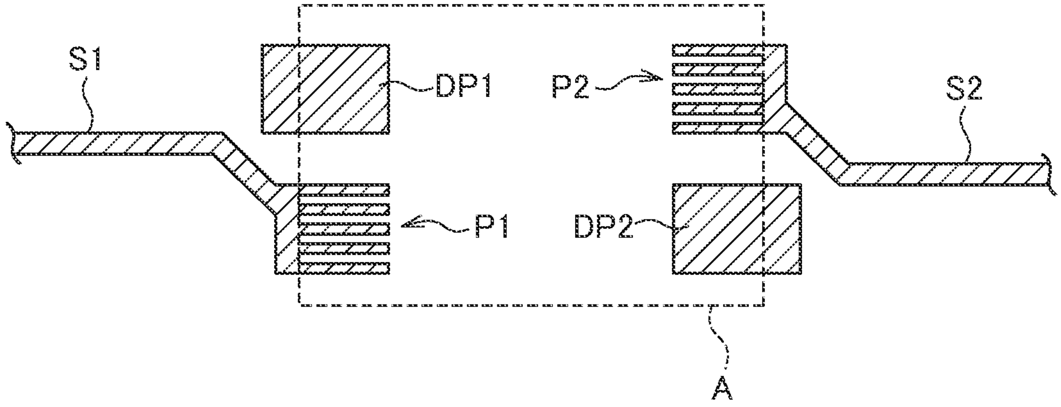
FIG. 7 is a schematic plan view illustrating the pattern layout on the substrate 10 according to a second modification.

FIG. 7 is a schematic plan view illustrating the pattern layout on the substrate 10 according to a second modification.

In the second modification illustrated in FIG. 7, the land patterns P1 and P2 each have a plurality of slit-shaped cuts. The land pattern (P1, P2) and the dummy land pattern (DP1, DP2) have the same outer size; however, since the presence of the slit-shaped cuts makes the effective area of the land pattern (P1, P2) smaller than that of the dummy land pattern (DP1, DP2). The effective area herein refers to the area of a part where the conductor pattern exists. By thus reducing the effective areas of the land patterns P1 and P2, the stray capacitance component Cpad generated between the land patterns P1, P2 and the ground pattern G is further reduced, thereby further improving impedance in a high-frequency region. In addition, the outer size of the land patterns P1 and P2 is maintained, so that connection strength by the solder 50 can be ensured.

While the preferred embodiment of the present invention has been described, the present invention is not limited to the above embodiment, and various modifications may be made within the scope of the present invention, and all such modifications are included in the present invention.

What is claimed is:

1. A circuit substrate comprising:
a substrate; and
a chip-type coil component surface-mounted on the substrate,
wherein the substrate includes:
first and second signal lines;
first and second land patterns connected respectively to the first and second signal lines; and
first and second dummy land patterns which are in a floating state,
wherein the coil component includes:
a drum-shaped core having first and second flange parts and a winding core part positioned between the first and second flange parts;
a first signal terminal and a first dummy terminal which are provided on the first flange part;
a second signal terminal and a second dummy terminal which are provided on the second flange part; and a wire wound around the winding core part and whose one end and other end are connected respectively to the first signal terminal and the second signal terminal, and wherein the coil component is mounted on the substrate such that the first and second signal terminals are connected respectively to the first and second land patterns and that the first and second dummy patterns are connected respectively to the first and second dummy land patterns.

2. The circuit substrate as claimed in claim 1, wherein each of the first and second dummy land patterns is an independent pattern not connected to any other pattern.

3. The circuit substrate as claimed in claim 1, wherein the first and second land patterns are smaller in effective area than the first and second dummy land patterns.

4. The circuit substrate as claimed in claim 3, wherein the first and second land patterns are the same in outer size as the first and second dummy land patterns, and wherein each of the first and second land patterns has a reduced effective area due to a presence of cuts formed therein.

5. The circuit substrate as claimed in claim 1, wherein the first land pattern and the second dummy land pattern face each other in an axial direction, and wherein the second land pattern and the first dummy land pattern face each other in the axial direction.

6. The circuit substrate as claimed in claim 1, wherein each of the first and second land patterns has a slit.

7. The circuit substrate as claimed in claim 6, wherein each of the first and second dummy land patterns is a solid pattern having no slit.

8. The circuit substrate as claimed in claim 1, wherein each of the first and second land patterns has a plurality of slits extending in an axial direction.

9. The circuit substrate as claimed in claim 1, wherein the substrate further includes a ground pattern that overlaps the first and second land patterns and the first and second dummy land patterns.

* * * * *